United States Patent
Kiefer et al.

(10) Patent No.: US 6,174,466 B1
(45) Date of Patent: Jan. 16, 2001

(54) METHODS FOR MAKING SEAMLESS CAPSULES

(75) Inventors: Jesse J. Kiefer, Belvidere; Blake H. Glenn, Madison, both of NJ (US); Suhas V. Patankar, Maple Grove, MN (US)

(73) Assignee: Warner-Lambert Company, Morris Plains, NJ (US)

( * ) Notice: Under 35 U.S.C. 154(b), the term of this patent shall be extended for 0 days.

(21) Appl. No.: 09/074,888

(22) Filed: May 8, 1998

(51) Int. Cl.[7] .................................. A61J 3/07; B01J 13/06
(52) U.S. Cl. .................................. 264/4.4; 264/14; 425/5
(58) Field of Search .......................... 264/4.3, 4.4, 11, 264/14; 425/6, 10, 5

(56) References Cited

U.S. PATENT DOCUMENTS

| | | |
|---|---|---|
| 2,857,281 | 10/1958 | Schultz et al. . |
| 3,971,852 | 7/1976 | Brenner et al. .................... 426/103 |
| 4,251,195 | 2/1981 | Suzuki et al. ......................... 425/6 |
| 4,422,985 | 12/1983 | Morishita et al. .................. 264/4.4 |
| 4,695,466 | 9/1987 | Morishita et al. .................. 424/456 |
| 4,888,140 * | 12/1989 | Schlameus et al. . |
| 5,009,900 | 4/1991 | Levine et al. .......................... 426/96 |
| 5,209,978 * | 5/1993 | Kosaka et al. . |
| 5,300,305 | 4/1994 | Stapler et al. ....................... 424/490 |
| 5,595,757 | 1/1997 | Kiefer et al. ....................... 424/451 |
| 5,650,232 | 7/1997 | Glenn et al. ...................... 428/402.2 |
| 5,795,590 * | 8/1998 | Kiefer et al. . |
| 5,888,538 * | 3/1999 | Kiefer et al. . |

FOREIGN PATENT DOCUMENTS 339958   2/1989   (EP) .

OTHER PUBLICATIONS

James R. Welty, et al. *Fundamentals of Momentum, Heat, and Mass Transfer*, Third Edition, pp. 163–164 (John Wiley and Sons 1984).

* cited by examiner

*Primary Examiner*—Harold Pyon
*Assistant Examiner*—Joseph Leyson
(74) *Attorney, Agent, or Firm*—Linda A. Vag

(57) ABSTRACT

Method for the production of seamless capsules in which capsule forming material passes from a heated carrier fluid to a cooled carrier fluid during formation and solidification of the capsules.

13 Claims, 2 Drawing Sheets

METHODS FOR MAKING SEAMLESS CAPSULES

BACKGROUND OF THE INVENTION

1. Field of the Invention

The present invention is related to a seamless capsule comprising a shell material encapsulating a center-filled core material, wherein the shell material is formed of a carbohydrate in a glassy state, and especially to methods and apparatus for making the seamless capsules for producing food products and topically applied products employing the same.

2. Description of the Prior Art

Traditionally, seamless capsules formed of a shell material encapsulating a core material have been made by using as the shell material film-forming materials such as gelatin and gums. These shell materials present two disadvantages. First, they are formed from an aqueous solution. Consequently, when the capsules are formed, large amounts of water must be removed, requiring great amounts of energy and long drying times. Second, these shell materials dissolve slowly when the capsules are being consumed, thereby leaving a distasteful plastic film-like residue in the mouth.

Seamless capsules are usually made by simultaneously extruding the shell material and the core material through concentrically aligned nozzles. The extruded shell material and the extruded core material exit the nozzles as a coaxial jet with the shell material surrounding the core material. The jet of the respective materials is fed into a downwardly flowing stream of cooled carrier liquid. While descending in the cooled carrier liquid, the coaxial jet breaks into droplets with the shell material encapsulating the core material. The droplets then solidify in the cooled carrier liquid to form seamless capsules. Such methods are disclosed, for example, in U.S. Pat. Nos. 4,251,195 and 4,695,466. However, when the shell material is a material that solidifies quickly, this prior art method is disadvantageous in that the shell material in the coaxial jet may solidify prior to encapsulation. As a result, seamless capsules may not be formed, and of the capsules that are formed some may not be spherical nor may they have a uniform size and shape.

An attempt to overcome this problem was proposed in U.S. Pat. No. 4,422,985, which describes a method that modifies the above-mentioned prior art method by introducing a coaxial triple jet, consisting of a heated circulating liquid surrounding the shell material which in turn surrounds the core material, into the cooled carrier liquid to allow encapsulation to take place. In this method, since capsule formation must still take place in the cooled carrier liquid, if any solidification of the shell material occurs prior to entering the cooled carrier liquid, encapsulation will not occur.

Other methods for making capsules typically involve using a screw extruder to extrude an emulsion containing the shell matrix and the material to be encapsulated. However, in such a process, it is difficult to make a capsule formed of a shell material encapsulating a center-filled core material. Instead, the encapsulated material is often in the form of globules that are distributed within the matrix. Other publications of interest in the formation of seamless capsules are mentioned below.

U.S. Pat. No. 2,857,281 describes a process for making a solid flavoring composition in the form of globular particles by extruding an emulsion containing a sugar base and flavor oil into droplets.

U.S. Pat. No. 3,971,852 describes a process for encapsulating oil in a cellular matrix that is formed of polyhydroxy and polysaccharide compounds. The oil is in an emulsified state with the cellular matrix, and the resulting emulsion is spray dried as droplets of the emulsion.

U.S. Pat. No. 5,009,900 discloses a process for encapsulating volatile and/or labile components with extruded glassy matrices, wherein the encapsulated material is distributed in the glassy matrices.

European Patent Application No. 0339958 discloses an antifoaming composition containing an outer shell of a meltable sugar in its crystalline state with an organopolysiloxane antifoaming composition imbedded therein. This composition is formed by melting a sugar base and dispersing the organopolysiloxane antifoaming composition in the sugar melt as the discontinuous phase. The melt is then solidified, thereby imbedding and entrapping the antifoaming composition, which is dispersed in the melt.

U.S. Pat. No. 5,300,305 relates to microcapsules that provide long lasting breath protection.

Of particular note is U.S. Pat. No. 5,595,757. The method described therein concerns the making of seamless capsules with a carbohydrate in a glassy state by providing a first duct located below a concentrically aligned multiple nozzle system. A coaxial jet is introduced into a flow of a heated carrier liquid within the first duct, thereby allowing the shell material to encapsulate the core material to form capsules in the heated carrier liquid. A second duct is located at least in part beneath the first duct, for receiving the flow of heated carrier liquid carrying the capsules from the first duct. A cooled carrier liquid is introduced into the second duct to form a flow of the cooled carrier liquid surrounding the capsules, thereby allowing the capsules to solidify.

In this prior art method, the cooled carrier fluid is purposely introduced concentrically with the heated carrier fluid to avoid turbulent flow which can damage the capsules. Because the fluids are therefore flowing in a laminar state, very little mixing of the heated carrier fluid and the cooled carrier fluid occurs. As a result of the laminar flow of the heated and cooled carrier fluids, capsule cooling will take place by conduction of heat from the hot stream to the cold stream.

However, while capsule cooling will take place, nonetheless heat conduction through laminar fluids is slow and therefore the length of the second duct carrying the cooled carrier fluid will need to be quite long, approaching 30 feet or more depending on the liquid flow rates. Excessively long ducts are needed in order to provide sufficient opportunity for the capsules to be properly cooled. In addition, it will not be possible to have a curvature in the duct (to reduce the space occupied by the capsule forming apparatus) until the capsules reach the solidification temperature since any contact with the walls of the duct prior to solidification will result in capsule deformation or blocking of the duct due to the insufficiently cooled capsules sticking along the wall.

It would therefore be a significant advance in the art of forming seamless capsules to provide a method of production which is cost efficient and does not require excessively long ducts to effect proper solidification of the capsules. Such a method would enable the production of a wide variety of products for consumption or application to the human body.

SUMMARY OF THE INVENTION

The present invention is generally directed to methods and apparatus for the production of seamless capsules comprising a shell material made of a glassy carbohydrate encapsulating a core material in which cooling takes place by the movement of the capsules themselves from a heated carrier liquid to a cooled carrier liquid due to the arrangement of the travel path of the respective fluid flows.

In particular, the method of the present invention comprises:

providing a concentrically aligned multiple nozzle system having at least an outer nozzle and an inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into a flow of a heated carrier liquid contained within a first duct, thereby allowing the shell material to encapsulate the core material to form capsules in the heated carrier liquid;

transporting the heated carrier liquid containing the capsules into a second duct at least a part of which is located beneath the first duct and which is positioned at an angle of inclination with respect to the first duct; and introducing a cooled carrier liquid into the second duct at said angle of inclination sufficient to enable the heated carrier liquid and cooled carrier liquid to flow adjacent to each other under laminar flow without substantial mixing for a time sufficient to allow the capsules to move from the heated carrier liquid to the cooled carrier liquid to enable the capsules to cool and thereby solidify.

The seamless capsules can be used, for example, in the production of food products, beverages, topical compositions and the like.

In another aspect of the invention, there is provided an apparatus for making seamless capsules comprising:

a concentrically aligned multiple nozzle system having at least an outer nozzle and an inner nozzle for simultaneously extruding a shell material through the outer nozzle and a core material through an inner nozzle, thereby forming a coaxial jet of the shell material surrounding the core material;

means for supplying the shell material to the outer nozzle and the core material is to the inner nozzle;

a first duct located beneath the multiple nozzle system for receiving the coaxial jet;

means for delivering a heated carrier liquid to the first duct to form a flow of the heated carrier liquid surrounding the coaxial jet, thereby allowing the shell material to encapsulate the core material to form capsules in the heated carrier liquid;

means for transferring the heated carrier liquid and capsules to a second duct;

means for delivering a cooled carrier liquid to a second duct; and said second duct, at least a part of which is located beneath the first duct, positioned at an angle of inclination with respect to the first duct to enable the respective heated and cooled carrier liquids to flow adjacent to each other under laminar flow without substantial mixing for a time sufficient to enable the capsules to move from the heated to the cooled carrier liquid and thereby solidify in the second duct.

BRIEF DESCRIPTION OF THE DRAWINGS

The following drawings are illustrative of embodiments of the invention and are not intended to limit the invention as encompassed by the claims forming part of the Application.

DETAILED DESCRIPTION OF THE INVENTION

Figure 1:
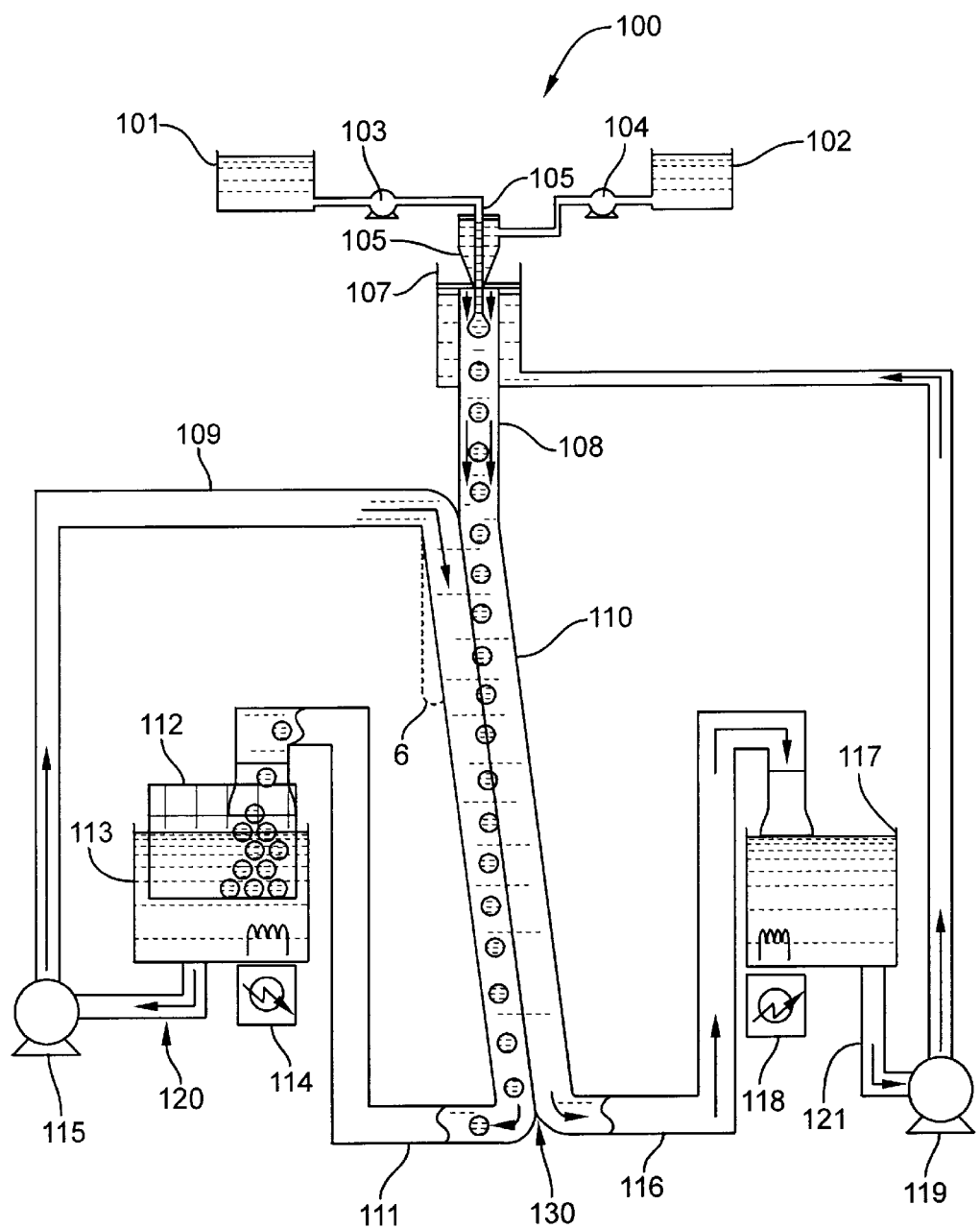
FIG. 1 is a schematic sectional side view of an apparatus for making seamless capsules according to one embodiment of the present invention.

In the method of U.S. Pat. No. 5,595,757, incorporated herein by reference, seamless capsules are formed in a heated carrier liquid and then the heated carrier liquid containing the capsules is introduced into a cooled carrier liquid allowing the carbohydrate based capsules to solidify. In this method, the heated and cooled carrier liquids do not mix. Capsule cooling occurs substantially by conduction of heat from the heated carrier liquid to the cooled carrier liquid with the capsule never contacting the cooled carrier liquid. Mixing of the respective carrier liquids is avoided so as not to introduce turbulence which could disrupt or distort the seamless capsule structure prior to solidification. In the absence of mixing, the conduction of heat from the heated to the cooled carrier liquid requires extended residence times necessitating the need for an excessively long duct to enable cooling to take place. This requirement can produce very cumbersome equipment designs that may not be practical for commercial applications.

In accordance with the present invention there is provided a method and an apparatus for cooling the seamless capsules without the need for an excessively long, cooling duct. The capsules formed in accordance with the method and apparatus of the present invention are of uniform size and shape even when carbohydrates are used as a shell material. In addition, the present method and apparatus can make seamless capsules formed of a shell material encapsulating a single center-filled core material, i.e., the core material is not distributed or dispersed within the shell material matrix.

The present invention is premised, in part, on the discovery that if the capsules can travel directly from the heated carrier liquid where they are formed to the cooled carrier liquid where they are solidified, cooling will take place rapidly and certainly in less time than would be required for the cooling of the heated carrier liquid as relied on in U.S. Pat. No. 5,595,757.

The method and apparatus of the present invention produces seamless capsules from a glassy carbohydrate in a cost efficient and effective manner. This is accomplished by meeting all of the following criteria; a) minimizing mixing of the heated and cooled carrier liquids (requiring that both the heated and cooled carrier liquids flow adjacent to each other under laminar flow conditions); b) minimizing the length of the duct in which the capsules are solidified [i.e. the duct (referred to hereinafter as "the second duct") below the duct (i.e. "the first duct") in which the capsules are first formed]; c) minimizing capsule contact with the walls of the second duct at least until the capsules have reached solidification temperature; d) requiring the capsules to exit the apparatus with the cooled carrier liquid; and e) providing a temperature low enough to adequately solidify the capsules (e.g. <30° C. for isomalt).

In meeting these criteria, Applicants have discovered that certain variables have a significant impact on the successful formation of the seamless capsules. First, the length of the second duct must be sufficient to enable the capsules to form yet can not be excessively long which will add significantly to the overall cost of the seamless capsule forming operation. Second, the liquid flow ratio (i.e. the ratio of the flow rate of the cooled carrier liquid to the heated carrier liquid) must be sufficient to provide an opportunity for the capsules to form in the heated carrier liquid and to solidify in the cooled carrier liquid in a second duct having as short a duct length as possible. Third, the second duct must be angled with respect to the initial vertical flow of the heated carrier liquid so that while the capsules fall essentially in a downward vertical path, the capsules pass from the heated carrier liquid to the cooled carrier liquid.

In carrying out the method of the present invention, it is important that the flow of the heated carrier liquid and the cooled carrier liquid be adjacent to each other and under laminar flow conditions. Laminar flow is a well-ordered type of flow which occurs when adjacent fluid layers slide smoothly over one another with mixing between layers or lamina occurring only on a molecular level. Laminar flow is quantitatively defined as having a Reynolds number of below 2300 as explained in James R. Welty et al. *Fundamentals of Momentum, Heat and Mass Transfer*, $3^{rd}$ Edition, pp. 163–164 (John Wiley and Sons 1984), incorporated herein by reference. As a consequence of laminar flow, there is only minimal mixing of the heated carrier liquid and the cooled carrier liquid. Thus, the present method provides for the flow of the capsules from the heated carrier liquid to the cooled liquid while the respective liquids remain separated from each other under laminar flow conditions.

In order to achieve these objects so that cooling of the capsules can effectively take place, the length of the second duct, the relative flow rates of the respective liquids, the angle of inclination of the lower, second duct with respect to the upper, first duct and the temperature of the cooled carrier liquid must be considered.

Before discussing the individual variables affecting capsule formation and solidification, a description of a suitable apparatus for forming and solidifying the capsules will now be provided. As shown in FIG. 1 there is provided an apparatus for making seamless capsules in accordance with the present invention. In general, the apparatus employs a second, lower duct which carries, under laminar flow conditions, both the heated carrier liquid containing the newly formed capsules from an upper, first duct and an adjacent flow of a cooled carrier liquid. The second duct is angled (i.e. angle of inclination) with respect to the longitudinal axis of the first duct and the flow path of the capsules as they travel from the first duct. The angled second duct enables the capsules to enter the cooled carrier liquid in the second duct to thereby solidify while continuing to fall downwardly in a vertical direction and in a similar flow path as traveled in the first duct.

The apparatus comprises a multiple nozzle system 100 having an outer nozzle 105 and an inner nozzle 106, which are concentrically aligned. The inner nozzle 106 is connected to a tank 101, which supplies the core material to the inner nozzle 106 through a gear pump 103. The outer nozzle 105 is connected to a tank 102 which supplies the shell material to the outer nozzle 105 through a gear pump 104. A first, upper duct 108 extends downwardly from the multiple nozzle system 100. The upper part of the first duct 108 is surrounded by a feed wier 107. The feed wier 107 is connected to a tank 117 which is provided with a heater 118 for heating a liquid which forms a heated carrier liquid that is fed through a feed pump 119 to the feed wier 107. The feed wier 107 has an overflow over the duct 108, thereby allowing the heated carrier liquid to flow from the feed wier 107 into the duct 108.

The lower end of the first duct 108 extends into the top on one side of a second duct 110. The second duct 110 is arranged so that it is inclined at an angle of inclination ($\theta$) with respect to the vertical orientation of the first duct 108. The angle $\theta$ which can range from about 1° up to about 90° must be sufficient to enable the heated carrier liquid and cooled carrier liquid to flow adjacent to each other under laminar flow conditions without substantial mixing. The angle $\theta$ is preferably in the range of from about 2 to 10° as shown specifically in the embodiment of FIG. 1.

The length of the second duct 110 must be sufficient to enable the capsules to transfer from the heated carrier liquid to the cooled carrier liquid during their descending path in the second duct 110 to thereby solidify. However, the length of the second duct must be minimized to make the system cost efficient. In accordance with the present invention the typical second duct 110 will have a length of at least about 2 feet, more typically from about 2 to 4 feet for the continuous production of seamless capsules on a commercial scale.

The cooled carrier liquid is brought into adjacent and laminar flow with the heated carrier liquid, as shown specifically in FIG. 1. In particular, the flow of the heated carrier liquid and the cooled carrier liquid exhibit a Reynolds Number of less than 2300 and very little mixing. As a consequence of employing a relatively short second duct, it is important that the properly formed capsules enter the cooled carrier liquid to complete the solidification process before the capsules exit the apparatus.

A cooled carrier liquid is supplied through a duct 109 which is in flow communication with the top of the second duct 110 adjacent to the duct 108. The duct 109 is connected to a tank 113, which is provided with a cooler 114 for cooling a carrier liquid to form the cooled carrier liquid. The cooled carrier liquid is fed through a feed pump 115 to the duct 109.

The lower portion of the second duct shown by the numeral 130 divides to provide flow communication with two adjacent recovery ducts 111 and 116, respectively. The recovery duct 111 extends toward and terminates a short distance from the tank 113. The solidified capsules which have previously transferred from the flow of the heated carrier liquid to the cooled carrier liquid stream enter the recovery duct 111. The capsules travel through the duct 111 and into a separator 112 which is arranged on the tank 113. The separator 112, which may be in the form of a net, separates the capsules from the cooled carrier liquid.

The tank 113 is connected through a pipe 120 to a feed pump 115 which then supplies the cooled carrier liquid back to the second duct 110 through the duct 109.

The recovery duct 116 for the heated carrier liquid extends toward the tank 117 and terminates at a small distance (e.g. several inches) from the top of the tank 117. The tank 117 is connected through a pipe 121 to a feed pump 119 which then supplies the heated carrier liquid to the feed wier 107.

The travel path of the capsules from the duct 108 through the duct 110 and into the duct 111 is critical to the present invention for the formation of seamless capsules. During passage through the second duct 110, the capsules formed in the duct 108 must transfer from the heated carrier liquid flowing from the first duct 108 to the cooled carrier liquid flowing from the duct 109. During this transfer process, it is desirable that the capsules do not engage the walls of the second duct 110 and that they be positioned to enter the duct 111 upon solidification. To insure proper transfer of the capsules and their solidification within the second duct 110, the length of the second duct, the flow ratio of the cooled carrier liquid to the heated carrier liquid, the angle of inclination of the second duct 110 and the temperature of the cooled carrier liquid must be selected to obtain the desired results of the invention.

As shown in Table 1 below, the above-mentioned variables impact the solidification of the capsules. Each of these variables will affect the capsules as they travel through the second duct. In particular, the three variables will impact on the development of the capsules including the position of the capsules before the exit of the second duct, the amount of mixing of the respective carrier liquids, the temperature of the capsules at the exit of the second duct and the position of the capsules at the exit of the second duct (i.e. how close the capsules are to the wall of the second duct adjacent the flow of the cooled carrier liquid). The relationships of the variables and their impact on the development of the capsules are summarized in Table 1.

TABLE 1

| | Length of Second Duct | | cooled: heated Liquid Flow Ratio | | Angle of Inclination | | Cooled Carrier Liquid Temperature | |
|---|---|---|---|---|---|---|---|---|
| | + | − | + | − | + | − | + | − |
| Position of capsule in second duct | Decr. | Incr. | Incr. | Decr. | Decr. | Incr. | X | X |
| Amount of liquid mixing | Incr. | Decr. | Decr. | Incr. | Incr. | Decr. | X | X |
| Capsule temperature at exit | Decr. | Incr. | Decr. | Incr. | Decr. | Incr. | Incr. | Decr. |
| Position of capsule at exit | Decr. | Incr. | Incr. | Decr. | Decr. | Incr. | X | X |

* Decr. and (−) stands for Decrease
* Incr and (+) stands for Increase
* X stands for no effect or limited effect As shown in Table 1, as the length of the second duct, flow ratio, angle of inclination of the second duct and the temperature of the cooled carrier liquid are individually adjusted (i.e. as represented by (+) and (−)), they will have an impact of the development of the capsules as they proceed through the process, including the position of the capsules in the second duct, the amount of mixing of the heated and cooled carrier liquids, the capsule temperature at the exit and the position of the capsules at the exit as indicated by (Incr) or (Decr).

The length of the second duct which is minimized owing to the position of the second duct at an angle φ with respect to the first duct, is preferably from about 2 to 4 feet. As shown in Table 1 as the length of the second duct increases, the position of the capsules in the second duct 110 (distance from the duct wall in contact with the heated carrier liquid), will increase. As a result, the capsule will get closer to the duct wall in contact with the cooled carrier liquid.

Increasing the length of the second duct will also increase the amount of the mixing between the heated and cooled carrier liquids. Therefore, a shorter second duct is desirable to minimize mixing of the respective liquid flows.

The length of the second duct will also impact the temperature of the capsules at the end of the second duct 110. As previously indicated, the capsules must be solidified when they enter the duct 111. Thus, the length of the second duct must be sufficient to enable the capsules to reach the solidification temperature (e.g. ≦30° C. for isomalt).

It is desirable that the capsules refrain from touching the walls of the second duct until the solidification process is complete. Contact with the walls of the second duct can damage or destroy the capsules. This is especially prevalent when the capsules have not yet solidified. Accordingly, it is desirable to have the capsules spaced apart from the walls of the second duct as the capsules leave the second duct 110 and enter the duct 111.

It has been observed that the length of the second duct will have an impact on the position of the capsules at the exit of the second duct 110. Increasing the length of the second duct will generally result in decreasing the distance between the capsules and the duct wall in contact with the cooled carrier liquid at the exit of the second duct. Therefore, if the capsules are positioned too close to the duct wall at the exit of the second duct, it may be desirable to reduce the length of the second duct.

In addition, it is desirable to employ a second duct having a non-circular cross-sectional profile. In a preferred form of the invention the second duct has a rectangular or square shaped cross-section since such ducts are better suited for preventing the mixing of the adjacent heated and cooled carrier liquids.

As shown in Table 1, the relative flow rates of the cooled and heated carrier liquids will also affect the solidification of the capsules within the second duct. Generally, the greater the flow of cooled carrier liquid relative to the flow of the heated carrier liquid, the greater the distance between the duct wall and the capsules as the capsules travel through the second duct. In addition, the temperature of the capsules at the exit of the second duct will be lower because of the greater contact time with the cooled carrier liquid. The flow ratio of the cooled carrier liquid to the heated carrier liquid in accordance with the present invention is generally in the range of from about 1:1 to 12:1, preferably from about 2:1 to 8:1.

The angle of inclination of the second duct (duct 110 shown in FIG. 1) is an important factor in governing the flow path of the capsules as they become solidified by the cooled carrier liquid. As the angle of inclination increases, the distance of the capsule to the duct wall in contact with the cooled carrier liquid and at the exit of the second duct decreases as does the temperature of the capsule at the exit.

Thus, as the angle of inclination increases, and depending on the length of the second duct there is the possibility that the capsules will contact the duct wall. This may be off-set, for example, by increasing the flow ratio of the cooled carrier liquid to the heated carrier liquid as indicated in Table 1.

For the preparation of capsules from a glassy carbohydrate the preferred angle of inclination is from about 2 to 10°. It will be understood, however, that the angle of inclination can be up to about 90° as shown in FIG. 2.

Figure 2:
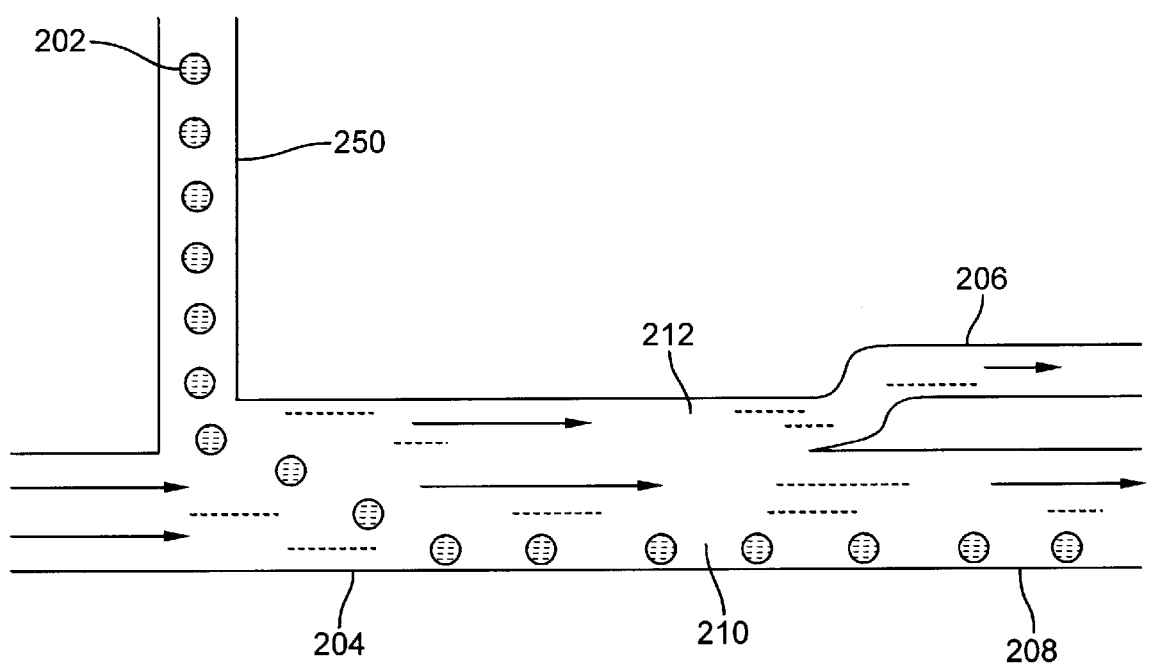
FIG. 2 is a partial schematic sectional side view of an apparatus for making seamless capsules according to another embodiment of the invention.

Referring to FIG. 2, there is shown an arrangement according to the present invention in which the second duct is inclined at a 90° angle with respect to the first duct. A first duct 200 contains a heated carrier fluid and newly formed capsules 202 travel downwardly into a second duct 204 which contains a cooled carrier liquid inclined at about a 90° angle with respect to the axis of the first duct 200. The end of the second duct 204 is divided so that the heated carrier liquid enters the duct 206 while the solidified capsules and the cooled carrier liquid enter the duct 208.

As shown in FIG. 2, there is provided a laminar flow of the cooled carrier liquid as a bottom stream 210 in the second duct 204. The heated carrier liquid forms an upper stream 212 and the two streams travel under laminar flow conditions. The distance of the second duct 204 is sufficient to enable the capsules to transfer from the heated carrier liquid 212 to the cooled carrier liquid 210 and solidify therein.

In a preferred aspect of the invention, the surface of capsules made from glassy carbohydrates should be below the glass transition temperature before it leaves the second duct and the capsules should be at a position less than 0.5 the distance across the second duct at the bottom so that the capsules exit with the cooled carrier liquid. It is preferred that the capsules not hit the duct wall unless the surface temperature is less than the glass transition temperature to prevent sticking to the inside surface of the wall.

Table 2 gives the capsule surface temperature at exit (Te) and position at exit (Xe) expressed as the fractional distance across the second duct such that the cold wall (the wall adjacent the cooled carrier liquid) is 0 and the hot wall (the wall adjacent the heated carrier liquid) is 1.0. The values given in Table 2 are based on the heated carrier liquid having a temperature of 100° C. and the cooled carrier liquid having a temperature of 0° C. It will be understood that the other temperatures for the heated cooled carrier liquids can be selected.

The parameters that effect these values are the angle of inclination (θ) and the cooled carrier liquid/heated carrier liquid flow ratio. The optimum value for each of these variables will depend on the capsule diameter and the length of the second duct.

TABLE 2

Computed Capsule Position and Surface Temperature Results

| Test # | Capsule Diameter (mm) | Angle Of Inclination (θ) degrees | Liquid Flow Ratio (cooled/heated) | Position at Exit (Xe) | Surface Temp at Exit (Te) ° C. |
|---|---|---|---|---|---|
| 1 | 8 | 3 | 1 | 0 | 45 |
| 2 | 8 | 3 | 2 | 0 | 28 |
| 3 | 8 | 3 | 8 | .44 | 30 |
| 4 | 1 | 3 | 1 | .51 | 64 |
| 5 | 1 | 5 | 1 | .28 | 48 |
| 6 | 1 | 7 | 2 | .42 | 13 |

The results in Table 2 show that for an 8 mm capsule, an angle of inclination θ of 3 degrees, and a flow ratio of 8 allows for adequate cooling and exit position using a 0.6 meter length second duct. The optimum values for the second duct in this example will most likely be an angle of inclination of 3 degrees and a flow ratio of from about 4 to 6. For a 1 mm capsule, an angle of inclination of 7 degrees and flow ratio of 2 gives adequate results. Again, the optimum for θ will be from 6 to 7 degrees and the flow ratio from 1 to 2.

The process of making seamless capsules in accordance with FIG. 1 will now be described in detail. The shell material is supplied from the tank 102 to the outer nozzle 105 and the core material is supplied from the tank 101 into the inner nozzle 106. The core material and the shell material are then simultaneously extruded to form a coaxial jet with the shell material surrounding the core material. The carrier liquid in the tank 117 is heated to a temperature that is close to or higher than the shell material and is supplied to the duct 107. Typically the temperature of the heated carrier liquid is from about 90° C. to 160° C. The coaxial jet is introduced to the first duct 108 containing the heated carrier liquid flowing downward. Because the heated carrier liquid is at a temperature that is close to the shell material in the coaxial jet, it prevents the shell material from solidifying, thereby allowing the shell material to encapsulate the core material to form capsules.

The carrier liquid in the tank 113 is cooled to a sufficiently low temperature to allow the capsules to solidify. Preferably, the carrier liquid is cooled to a temperature of from about 0° C. to 30° C. for typical glassy carbohydrate materials. The cooled carrier liquid is supplied from the tank 113 to the duct 109. The capsules from the first duct 108 are then carried by the heated carrier liquid into the top of one side of the second duct 110. A cooled carrier liquid is also supplied to the top of the second duct 110 from the duct 109 which is arranged at the top of second duct 110 adjacent the first duct 108. The capsules in the heated carrier liquid are carried into one side of the second duct 110 adjacent to the flow of cold carrier liquid also flowing in the second duct 110. Due to the angle of inclination θ, typically up to 90° preferably from about 2 to 10° and the laminar flow condition of the liquids, the heated carrier liquid and the cooled carrier liquid flow adjacent to each other without significant mixing. Due to the greater density of the capsules compared to the liquid, the capsules tend to flow substantially vertical and therefore will cross over the interface of the respective liquids into the cooled carrier liquid because of the angle of inclination of the second duct.

Any liquid that does not dissolve the shell material and can be heated and cooled to the appropriate temperature without undergoing phase change can be used as the carrier liquid in the present invention. Examples of suitable carrier liquids include medium chain triglyceride (MCT) oil, corn oil, cottonseed oil, canola (rapeseed) oil, sunflower oil, silicone oils, mineral oils and the like.

Preferably, the shell material and the core material are simultaneously extruded by setting the fluid volumetric flux of the shell material through the outer nozzle equal to the fluid volumetric flux of the core material through the inner nozzle. The fluid volumetric flux of a material flowing from a nozzle orifice is defined as the ratio of the volumetric flow rate of the material through the nozzle to the nozzle orifice area. As described in U.S. Pat. No. 5,650,232, the disclosure of which is incorporated herein by reference, by setting the fluid volumetric flux of the shell material equal to that of the core material through the concentrically aligned nozzles, the mass ratio of the core material to the shell material in the capsule can be controlled by merely varying the size of the orifice areas of the nozzles.

The concentrically aligned multiple nozzle system that can be used in the present invention can have more than two concentrically aligned inner and outer nozzles. There can be one or more concentrically aligned intermediate nozzles positioned between the inner and outer nozzles, from which one or more intermediate shell materials can be extruded. In such an embodiment, the shell material extruded from the outer nozzle encapsulates the intermediate shell material extruded from the intermediate nozzle, which in turn encapsulates the core material from the inner nozzle. In a preferred embodiment of this invention, the fluid volumetric flux of the intermediate shell material through the intermediate nozzle will be set to be equal to the fluid volumetric flux of shell material through the outer nozzle and the fluid volumetric flux of the core material through the inner nozzle.

Examples of suitable carbohydrates that can be used as the shell material in the present invention include sucrose, glucose, fructose, isomalt, hydrogenated starch hydrolysate, maltitol, lactitol, xylitol, sorbitol, erythritol, mannitol, and the like, and mixtures thereof. Typically, the carbohydrate is fed into the outer nozzle as the shell material in the form of a melt. When the carbohydrate solidifies in the cooled carrier liquid, it turns into a glassy state, i.e., amorphous state. When the carbohydrate is in a glassy state, it exhibits an enhanced ability to protect the center-filled core material from vaporization and deterioration.

Suitable core materials are those which can be incorporated into the various products for consumption and topical application previously described. Core materials are typically in liquid form or meltable solid materials. Examples of suitable core materials include MCT oils, (e.g., such as coconut oil,), peppermint oil, cinnamon oil, fennel oil, clove oil, wheat-canola (rapeseed) oil, sunflower oil and the like, silicone oils, mineral oils, fruit flavors, vitamins, pharmaceutical solutions, natural and artificial sweeteners, menthol, and the like.

Any material that is liquid at the operating temperature and does not dissolve the core or shell materials and further solidifies during the cooling process may be used as an intermediate shell material. Examples of suitable intermediate shell materials include waxes (e.g., paraffin wax, microcrystalline wax, polyethylene wax, carnauba wax, candelilla wax and the like) and fats (e.g., hydrogenated fats such as those known to persons of ordinary skill in the art).

The end use compositions in which the seamless capsules of the present invention are employed include consumable products and products applied to the human body.

The consumable products include foodstuffs, beverages, medicament compositions, chewing gums, confectionery, and dentifrice compositions. Preferably, the consumable product does not adversely affect the integrity of the seamless capsule. For example, some consumable products which have a high water activity could adversely affect the carbohydrate shell such as by rupturing the shell. For such applications damage to the shell can be avoided by adding the capsule to the product at the time of consumption. Foodstuffs include ice cream, jellies, whipped toppings, and the like. Beverages include both non-alcoholic beverages such as carbonated sodas, tea, juices and the like as well as alcoholic beverages.

Medicament compositions include, for example, antiseptics, analgesics, antibiotics, antifungals, cough mixtures, antacids, digestive aids, decongestants and the like. Such compositions may be administered as tablets, lozenges, nose sprays, liquid formulations, capsules, geltabs, and the like.

Chewing gums include those having a soft or hard shell both containing sugar and sugar free.

Confectionery include, but are not limited to hard and soft candy compositions, chocolates, candy bars and the like.

Dentifrice compositions include, for example, toothpastes, antiplaque washes, mouthwashes, gargles, and the like.

Products produced in accordance with the present invention which are applied to the human body include toiletries, such as shaving lotions, soaps, creams and foams, colognes, deodorants, antiperspirants, bath oils, shampoos, hair treating compositions, conditioners, sunburn lotions, talcum powders, face creams, hand creams, eye drops, and the like.

The following examples show the preparation of seamless capsules in accordance with the present invention. The length of the second duct, the liquid flow ratio (i.e. the ratio of the flow rates of the cooled carrier liquid to the heated carrier liquid) and the angle of inclination (i.e. the angle of the second duct with respect to the initial vertical flow of the heated carrier liquid) are selected to enable solidified capsules to exit with the cooled carrier liquid without excessive mixing of the respective liquids and without substantial contact of the capsules as they are forming (i.e. prior to solidification) with the duct walls.

EXAMPLE 1

Seamless capsules were prepared using the concentrically aligned multiple nozzle system shown in FIG. 1 having an inner nozzle and an outer nozzle. The inner nozzle has an inside diameter of 0.02 cm, and outside diameter of 0.26 cm, and an orifice area of 0.0314 $cm^2$. The outer nozzle has an inside diameter of 0.39 cm and an annular orifice area of 0.0664 $cm^2$.

A mixture of 90 wt. % isomalt and 10 wt. % xylitol was melted at a temperature of 155° C. and maintained in a tank at 148° C. This mixture had an actual viscosity of 628 cps at 140° C. Generally, the methods of the present invention would involve the use of shell materials having an actual viscosity of less than about 1000 cps at the operating temperature. The resultant mixture had a density of 1.4 g/mL.

The mixture was fed to the outer nozzle at a temperature of 145° C. and a volumetric flow rate of 2.37 mL/min. A mixture of 10 wt. % cherry flavor and 90 wt. % cotton seed oil having a density of 0.96 g/mL was supplied to the inner nozzle as the core material at ambient temperature and a volumetric flow rate of 5.01 mL/min. The shell material and the core material were then simultaneously extruded from the outer and inner nozzles, respectively, at the same fluid volumetric flux of 75.5 mL/min./$cm^2$ into a heated coconut oil carrier fluid maintained at 100° C. The coaxial jet descends into the heated coconut oil for about 5 cm and breaks into droplets allowing encapsulation to take place. The capsules are then carried by the heated coconut oil into an inclined second duct having the dimensions shown in Table 3. Inside the second duct the heated coconut oil flows adjacent to a cooled coconut oil maintained at 0° C. The flow rates of the cooled and heated liquids and the ratio of the flows are set forth in Table 3. The forming capsules cross the boundary separating the heated and cooled coconut oil and upon entering the cooled coconut oil the melted shell material begins to solidify without engaging the walls of the inclined duct (i.e. the position of the capsules at the exit is 0.42, slightly closer to the duct wall in contact with the cooled carrier liquid). The capsules solidify as they travel the remainder of the distance along the second duct and exit with the cooled coconut oil into the cold exit side at the base of the inclined duct at a temperature of about 30°. The thus formed capsules had a diameter of about 8 mm.

The Reynolds number of the cooled and heated carrier liquids were calculated and found to be 98.93, indicating that the flows were maintained under laminar conditions.

TABLE 3

|  | Example 1 (8 mm capsule) | Example 2 (1 mm capsule) |
| --- | --- | --- |
| Second Duct Width (cm) | 2.54 | 2.54 |
| Second Duct Depth (cm) | 5.08 | 5.08 |
| Second Duct Length (cm) | 61.00 | 61.00 |
| Cross Sectional Area ($cm^2$) | 12.90 | 12.90 |
| Hydraulic Diameter (cm) | 3.39 | 3.39 |
| Angle of Inclination ($\theta$) | 3° | 7° |
| Cooled Oil Flow Rate (mL/min) | 5440.00 | 3600.00 |

TABLE 3-continued

|  | Example 1 (8 mm capsule) | Example 2 (1 mm capsule) |
|---|---|---|
| Heated Oil Flow Rate (mL/min) | 680.00 | 1800.00 |
| Cooled Oil: Heated Oil Flow Ratio | 8.00 | 2.00 |
| Total Flow Rate (mL/min) | 6120.00 | 5400.00 |
| Total Average Velocity (cm/s) | 7.91 | 6.98 |
| Cooled Oil Temp | 0.00 | 0.00 |
| Heated Oil Temp | 100.00 | 100.00 |
| Average Oil temp | 11.11 | 33.33 |
| Oil Viscosity (cP) | 25.79 | 15.64 |
| Oil Viscosity (Poise) | 0.26 | 0.16 |
| Oil Density (g/mL) | 0.95 | 0.94 |
| Reynolds Number | 98.93 | 141.42 |

EXAMPLE 2

The procedure employed in Example 1 was repeated using the same capsule forming equipment. The flow rate of the cooled carrier liquid was increased and the flow rate of the heated carrier liquid was decreased to provide a cooled carrier liquid: heated carrier liquid flow ratio of 2:1 as shown in Table 3. In order to provide for the solidification of the capsules without contacting the duct walls (i.e. the position of the capsules at the exit is 0.44, slightly closer to the duct wall in contact with the cooled carrier liquid) and for the solidified capsules to exit with the cooled carrier fluid, the angle of inclination of the duct was increased to 7°. The cooled and heated carrier liquids had a Reynolds number of 141.42, indicative of laminar flow conditions. The resulting capsules had a diameter of about one mm and exited the system at a temperature of about 30° C.

What is claimed is:

1. A method for making a seamless capsule comprising a shell material encapsulating a center-filled core material comprising the steps of:

providing a concentrically aligned multiple nozzle system having at least an outer nozzle and an inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into a flow of a heated carrier liquid contained within a first duct, thereby allowing the shell material to encapsulate the core material to form capsules in the heated carrier liquid;

transporting the heated carrier liquid containing the capsules into a second duct at least a part of which is located beneath the first duct and which is positioned at an angle of inclination with respect to the first duct; and introducing a cooled carrier liquid into the second duct at said angle of inclination sufficient to enable the heated carrier liquid and the cooled carrier liquid to flow adjacent each other under laminar flow without substantial mixing for a time sufficient to allow the capsules to move from the heated carrier liquid to the cooled carrier liquid to enable the capsules to cool and thereby solidify.

2. The method of claim 1 wherein the second duct is positioned at an angle of inclination of up to about 90° with respect to the first duct.

3. The method of claim 2 wherein the angle of inclination is from about 2 to 10°.

4. The method of claim 1 wherein the length of the second duct is at least about 2 feet.

5. The method of claim 4 wherein the length of the second duct is from about 2 to 4 feet.

6. The method of claim 1 wherein the flow ratio of the cooled carrier liquid to the heated carrier liquid is from about 1:1 to 12:1.

7. The method of claim 6 wherein the flow ratio is from about 2:1 to 8:1.

8. The method of claim 1 wherein the second duct has a non-circular cross-section.

9. The method of claim 8 wherein the second duct has a rectangular or square cross-section.

10. The method of claim 1 comprising introducing a carbohydrate in a melted state to the outer nozzle.

11. The method of claim 10 wherein when the capsules solidify the carbohydrate is in a glassy state.

12. The method of claim 1 wherein the shell material and the core material are simultaneously extruded by setting the fluid volumetric flux of the shell material through the outer nozzle equal to the volumetric flux of the core material through the inner nozzle.

13. The method of claim 1 wherein the second duct has opposed walls, the capsules are at a position at the end of the second duct within the cooled carrier liquid.

* * * * *